United States Patent
Abbatiello et al.

(10) Patent No.: US 11,787,934 B2
(45) Date of Patent: *Oct. 17, 2023

(54) RECYCLED AND RENEWABLE POLYMERIC COMPOSITION FOR COMPUTER CHASSIS

(71) Applicant: Dell Products L.P., Round Rock, TX (US)

(72) Inventors: Nicholas D. Abbatiello, Round Rock, TX (US); Xinhua Tian, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,978

(22) Filed: Oct. 24, 2022

(65) Prior Publication Data

US 2023/0143586 A1  May 11, 2023

Related U.S. Application Data

(63) Continuation of application No. 17/082,975, filed on Oct. 28, 2020, now Pat. No. 11,505,697.

(51) Int. Cl.
C08L 69/00 (2006.01)

(52) U.S. Cl.
CPC ......... *C08L 69/00* (2013.01); *C08L 2205/025* (2013.01)

(58) Field of Classification Search
CPC ........................... C08L 69/00; C08L 2205/025
See application file for complete search history.

(56) References Cited

U.S. PATENT DOCUMENTS

| | | | |
|---|---|---|---|
| 11,505,697 B2 * | 11/2022 | Abbatiello | ............. C08L 69/00 |
| 2007/0082995 A1 | 4/2007 | Costanzi et al. | |
| 2012/0046411 A1 | 2/2012 | Kulshrestha et al. | |
| 2014/0128540 A1 | 5/2014 | Penco et al. | |
| 2014/0200302 A1 | 7/2014 | Kulkarni et al. | |
| 2014/0371360 A1 | 12/2014 | Zheng et al. | |

(Continued)

FOREIGN PATENT DOCUMENTS

| | | |
|---|---|---|
| CN | 103740082 | 4/2014 |
| CN | 103740082 A | 4/2014 |
| WO | 2020/148723 A1 | 7/2020 |

OTHER PUBLICATIONS

Chapman A. M. et al., "Adding Value to Power Station Captured C02: Tolerant Zn and Mg Homogeneous Catalysts for Polycarbonate Polyol Production", ACS Catalysis, 2015, vol. 5, issue 3, pp. 1581-1588.

*Primary Examiner* — Ellen M McAvoy
(74) *Attorney, Agent, or Firm* — NORTON ROSE FULBRIGHT US LLP

(57) ABSTRACT

Polymeric compositions, methods of making the compositions, and composites, such as computer chassis containing the compositions are described. The polymeric compositions can contain 20 wt. % to 50 wt. % of a post-consumer mechanical recycled polycarbonate; 10 wt. % to 50 wt. % of a renewably sourced polycarbonate; 10 wt. % to 30 wt. % of a filler containing carbon fibers, wherein at least a portion of the carbon fibers are obtained from a post-industrial recycled source; and 5 wt. % to 15 wt. % of a flame retardant, wherein the polymeric compositions have a total recycled and renewable content of 50 wt. % to 90 wt. %.

20 Claims, 4 Drawing Sheets

(56) References Cited

U.S. PATENT DOCUMENTS

| | | |
|---|---|---|
| 2015/0031837 A1 | 1/2015 | Favis et al. |
| 2015/0291763 A1 | 10/2015 | Bell et al. |
| 2016/0039118 A1 | 2/2016 | Gehr |
| 2016/0326367 A1 | 11/2016 | Mohanty et al. |
| 2017/0190914 A1 | 7/2017 | Kim et al. |
| 2017/0350040 A1 | 12/2017 | Ijuin |
| 2018/0105668 A1 | 4/2018 | Srubar et al. |
| 2019/0322863 A1 | 10/2019 | Tonosaki |
| 2019/0330467 A1 | 10/2019 | Tonosaki |
| 2020/0354569 A1 | 11/2020 | Van Nuffel et al. |
| 2022/0064439 A1 | 3/2022 | Ziegler et al. |
| 2022/0130626 A1 | 4/2022 | Abbatiello et al. |
| 2022/0389216 A1* | 12/2022 | Kalyanaraman ......... C08J 11/08 |

* cited by examiner

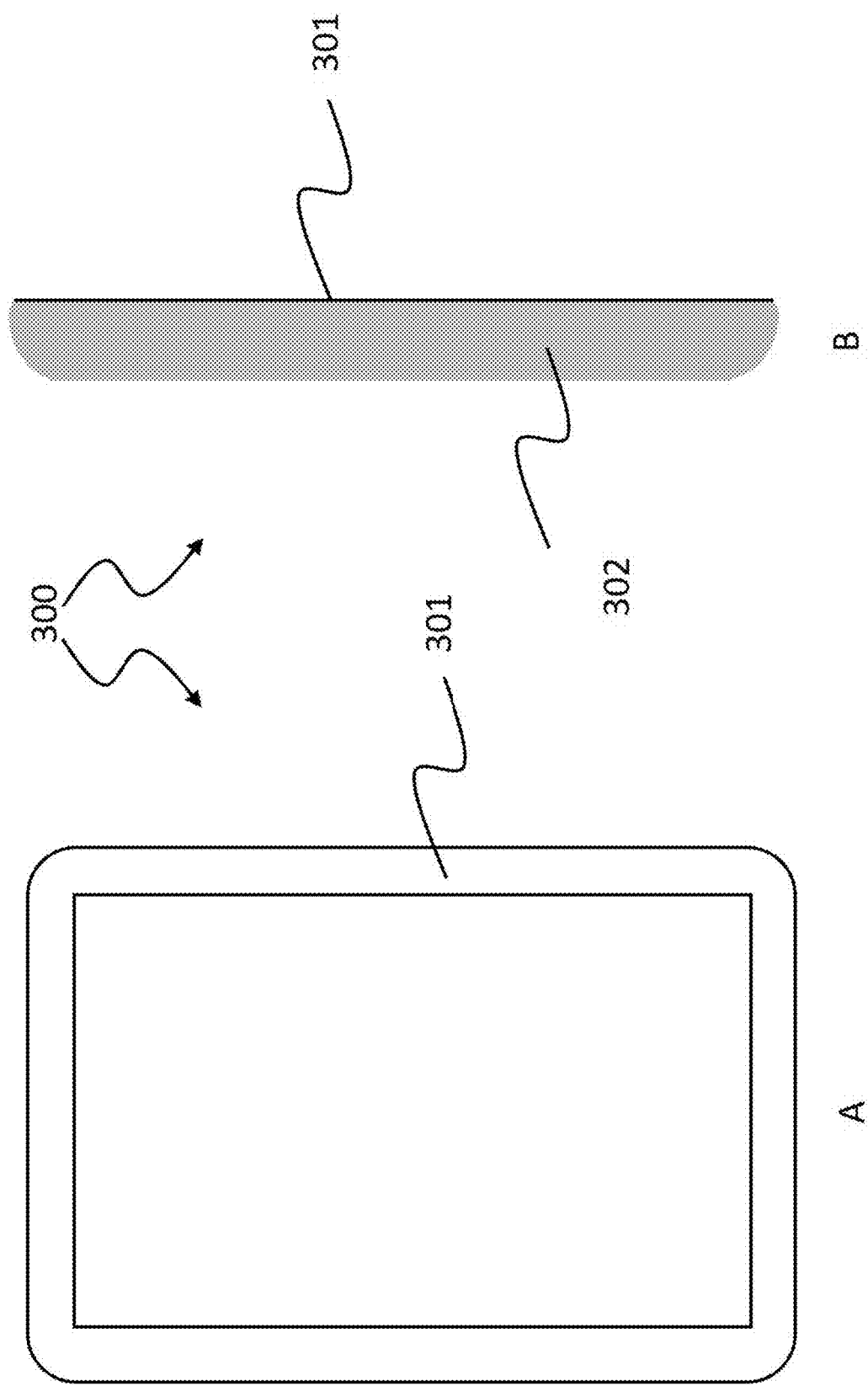

RECYCLED AND RENEWABLE POLYMERIC COMPOSITION FOR COMPUTER CHASSIS

CROSS-REFERENCE TO RELATED APPLICATIONS

This application is a continuation of U.S. Non-Provisional patent application Ser. No. 17/082,975 filed on Oct. 28, 2020, all of which is incorporated herein by reference in its entirety.

BACKGROUND OF THE INVENTION

A. Field of the Invention

The invention generally relates to polymeric compositions with high recycle and renewable content while having sufficient mechanical strength for use in articles of manufacture. For example, the polymeric compositions can be used in the computer industry (e.g., chassis) and can allow for a more sustainable product (e.g., desktop, laptop, or mobile device computers).

B. Description of Related Art

Polycarbonates are used in electronic and electrical devices such as computers, notebooks, laptops, cell phone, personal computers, e-books, and tablet personal computers, due to their light weight and good mechanical properties. However certain commonly used polycarbonates, such as Bisphenol A (BPA) polycarbonates, are non-biodegradable and if not recycled can create various environmental problems, e.g. landfills, increased use of natural resources and energy etc. Thus, efforts have been made to increase recycle content of articles of manufacture that use polycarbonates. A traditional recycling method includes mechanical recycling. Mechanical recycling typically includes collecting used products or debris having the target polymer (e.g., polycarbonate-based plastics), optionally washing the used products or debris, melting the used products or debris into a raw material having the target polymer, and reusing the raw material to produce new articles of manufacture. A problem with mechanical recycling is that the mechanical properties (e.g. tensile strength, tensile modulus etc.) of the recycled plastics (e.g. polycarbonates) can decrease. This decrease in mechanical properties can be caused by the mechanical recycling process (e.g., input of energy during the melting process can lead to polymer chain scissions and lead to weaker polymers). Thus, mechanical properties of an article of manufacture can decrease (e.g., reduction in ductility), with increasing amounts of mechanically recycled polymer. This can present a significant limit on the amount of recycled material that can be used in articles of manufacture such as various parts of electronic and electrical devices.

A typical solution to counteract the reduced mechanical properties of mechanically recycled polymer is the use of additives and introduction of other materials into the polymer composition. This solution can increase costs associated with the polymer composition, can reduce the sustainability of the polymer composition, and/or can introduce caustic or environmentally unfriendly materials to the polymer composition.

SUMMARY OF THE INVENTION

A discovery has been made that provides a solution to at least some of the aforementioned problems. In one aspect of the present invention, the solution can include supplementing the polymeric composition comprising mechanically recycled polymer (e.g., mechanically recycled polycarbonate) with other recycled components and/or components made from renewable material. This can result in an article of manufacture (e.g., chassis for desktops, laptops, or mobile devices) that has a high overall content of recycled material without detrimentally comprising the mechanical strength of the resulting article of manufacture. In one aspect of the present invention, it was found that a composition containing particular amounts of post-consumer mechanical recycled polycarbonate, renewably sourced polycarbonate, recycled carbon fibers, and flame retardant can have excellent mechanical properties and high recycle and renewable content. Therefore, articles of manufacture made from such compositions can be more sustainable and/or less caustic to the environment.

One aspect of the present invention is directed to a polymeric resin composition. The polymeric composition can contain a post-consumer mechanical recycled polycarbonate, a renewably sourced polycarbonate, a filler containing carbon fibers, and optionally a flame retardant. In certain aspects, the polymeric composition can contain 20 wt. % to 50 wt. % of the post-consumer mechanical recycled polycarbonate, 10 wt. % to 50 wt. % of the renewably sourced polycarbonate, 10 wt. % to 30 wt. % of the filler containing carbon fibers, and 5 wt. % to 15 wt. % of the flame retardant. The post-consumer mechanical recycled polycarbonate can contain, at least in part, mechanically recycled polycarbonate from post-consumer waste. In some aspects, the post-consumer mechanical recycled polycarbonate can have a recycle content of 80 wt. % to 100 wt. %, or 90 wt. % to 100 wt. %, or 95 wt. % to 100 wt. %, or 98 wt. % to 100 wt. %, or 99 wt. % to 100 wt. %, or about 100 wt. %. The renewably sourced polycarbonate can be produced, at least in part, from a renewable feedstock. The renewable feed stock can be tall oil, sugar, castor beans and/or $CO_2$, such as waste $CO_2$. In some particular aspects, the renewable feed stock can be tall oil derived from wood pulp. Renewably sourced polycarbonate can include carbon atoms from renewable feed stock. In some aspects, the renewable content of the renewably sourced polycarbonate can be 13 wt. % to 65 wt. %. In some aspects, at least a portion of the carbons in the renewably sourced polycarbonate can be derived from the renewable feed stock. In some aspects, at least 70%, or at least 80%, or at least 90%, or at least 95%, or 100% of the carbons in the renewably sourced polycarbonate can be derived from the renewable feed stock. In some aspects, at least a portion of the oxygens and/or hydrogens in the renewably sourced polycarbonate can be obtained from non-renewable source(s).

In some aspects, the polymeric resin composition can contain a polycarbonate polymer, that is a non recycled polymer (e.g. virgin polycarbonate) and is obtained from a non-renewable source. In some aspects, the polymeric resin composition can contain less than 5 wt. %, or less than 2 wt. %, or less than 1 wt. %, or less than 0.1 wt. %, or is free of, or essentially free of polycarbonate that is a non recycled and non-renewable polycarbonate.

At least a portion of the carbon fibers can be obtained from recycling post-industrial waste. In some aspects, the carbon fibers can have a recycle content of 10 wt. % to 30 wt. %. The carbon fibers can contain standard modulus, intermediate modulus, and/or high strength carbon fibers. In some aspects, the optional flame retardant can be obtained, at least in part, from a renewable source. In some aspects, the renewable content of the flame retardant can be 20 wt. % to 50 wt. %. In some aspects, the flame retardant can be a non-halogenated flame retardant. In some aspects, the flame retardant can be a non-halogenated phosphorus containing flame retardant obtained from bio based chemicals. In some aspects, the flame retardant can be bisphenol-A-diphosphate obtained from bio based chemicals. In some aspects, the polymeric composition can further contain one or more additives selected from the group pigments, plasticizers, antioxidants, UV-stabilizers, heat stabilizers, dye enhancing agents, lubricant, mold release agents, crystal nucleating agents, fluidability-improving agents, antistatic agents, compatibilizer, or anti-drip agents, or any combinations thereof. In certain aspects, the one or more additives can be pigments, and plasticizers. In certain aspects, the polymeric composition can contain 20 wt. % to 50 wt. % of the post-consumer mechanical recycled polycarbonate, 10 wt. % to 50 wt. % of the renewably sourced polycarbonate, 10 wt. % to 30 wt. % of the filler, 5 wt. % to 15 wt. % of the flame retardant, 0.1 wt. % to 3 wt. % of the pigment, and 0 to 5 wt. % of the plasticizer. The polymeric composition can have a total recycled and renewable content of 50 wt. % to 90 wt. %. The polymeric composition of the present invention can have any one of, any combination of, or all of the following properties: a density of 1 to 1.4 g/cc, or 1.25 to 1.35 g/cc, or 1.28 to 1.3 g/cc, at 23° C. measured in accordance with ASTM D792; a tensile modulus equal to or greater than 17000 MPa, or 17000 MPa to 22000 MPa, or 17000 MPa to 20000 MPa at 23° C., as measured in accordance with ISO 527-1,-2 at 5 mm/min; a tensile strength at break equal to or greater than 155 MPa, or 155 MPa to 190 MPa, or 155 MPa to 170 MPa at 23° C., as measured in accordance with ISO 527-1,-2 at 5 mm/min; a tensile elongation at break ≥1.1%, or ≥1.3%, or ≥1.4%, at 23° C., as measured in accordance with ISO 527-1,-2 at 1 mm/min; and a flexural modulus equal to or greater than 15500 MPa at 23° C., or 15500 MPa to 19000 MPa, or 15500 MPa to 17500 MPa at 23° C., as measured in accordance with ISO 178 at test speed of 2 mm/min. In some aspects, the composition can be comprised in a film, layer, or a sheet. In some aspects, the polymeric composition can be a extrusion molded, a blow-molded, an injection-molded, rotational molded, compression molded, 3-D printed, and/or thermoformed composition. In some aspects, the polymeric composition can be comprised in an article of manufacture. In some aspects, the article can be computer part. The computer can be a desktop computer, laptop computer, notebook computer, cell phone, computer tablet, calculator or the like. In some aspects, the article of manufacture can be a computer chassis or chassis part, such as a desktop computer chassis or chassis part or a laptop computer chassis or chassis part.

In some aspects, a polymeric resin composition of the present invention can have a tensile elongation at break, at 23° C., as measured in accordance with ASTM D638 at test speed of 5 mm/min, that is higher, than that of a substantially identical reference composition containing post-consumer mechanical recycled polycarbonate instead of the renewably sourced polycarbonate. As used herein, a "substantially identical reference composition" is a composition that includes the same components, and the same amounts of the components, as the example composition, except that the reference composition does not include the recited component (e.g., the is omitted). Where one component is removed, the wt. % of the removed component is added to the primary polymer in the composition. Thus, if an example composition includes 35 wt. % of the post-consumer mechanical recycled polycarbonate, 35 wt. % of the renewably sourced polycarbonate, 20 wt. % of the filler, and 10 wt. % of the flame retardant, a substantially identical reference composition containing post-consumer mechanical recycled polycarbonate instead of the renewably sourced polycarbonate includes 70 wt. % of the post-consumer mechanical recycled polycarbonate, 20 wt. % of the filler, and 10 wt. % of the flame retardant. The recycled content of the reference composition and the total recycled and renewable content of the example composition can be the same.

One aspect of the present invention is directed to a computer chassis containing a polymeric composition described herein. The computer chassis can be for a desktop computer, a laptop computer, a notebook computer, or a mobile device (e.g., a cell phone, a computer tablet, a calculator or the like). Certain aspects are directed to a desktop computer chassis, or a laptop computer chassis, or a computer tablet chassis containing a polymeric composition described herein. In some aspects, the recycle content and renewable content of the computer chassis can be at least 70%. The recyclable and/or renewable material of the computer chassis can contain plastics and/or carbon fibers.

One aspect of the present invention is directed to a method of making a computer chassis described herein. The method can include forming and/or obtaining a polymeric composition described herein and forming at least a portion of the computer chassis with the polymeric composition.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions the invention can be used to achieve methods of the invention.

The following includes definitions of various terms and phrases used throughout this specification.

As used herein recycle content of a material refers to the wt. % of the material obtained from, made from, and/or recovered from waste. Unless mentioned otherwise the waste can be post-industrial or post-consumer waste. Post-consumer waste of a material is a waste generated by a customer of a substrate containing the material. Post-industrial waste is waste generated during a production process of a product and has not used in the consumer market.

As used herein renewable content of a material refers to wt. % of the material obtained from or made from a bio-based renewable material. Unless mentioned otherwise, bio-based material can include materials from any life form such as plants, animals, fungi, protists, prokaryotes, microbes, algae, bacteria, yeasts and/or moulds. The bio-based material can be obtained from natural or genetically engineered species. Non-limiting examples of bio-based renewable material includes tall oil, sugar, castor beans, and/or $CO_2$, such as waste $CO_2$.

As used herein total recycled and renewable content of a material refers to wt. % of the material obtained from, made from and/or recovered from waste and wt. % of the material obtained from or made from a bio-based renewable material. For example for a 100 gm material is 10 gm is obtained recycled sourced and 10 gm is obtained from renewable source, the total recycled and renewable content of the material is 20 wt. %.

Computer chassis as used herein refers to housing, casing component for the computer and/or parts of the computer such as central processing unit (CPU), monitor, display of the monitor, input device such as keyboard, mouse and/or mouse pad, storage unit such as solid state drive, hard disk drive, graphics processing unit, random access memory, sound card, speakers, microphones, webcam and/or motherboard.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm" refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The polymeric composition of the present invention can "comprise," "consist(s) essentially of," or "consist of" particular ingredients, components, compositions, etc. disclosed throughout the specification. In one aspect of the present invention, and with reference to the transitional phrase "consist(s) essentially of" or "consisting essentially of," a basic and novel characteristic of the present invention can include the polymeric compositions having (1) high recycle and renewable content and/or (2) high impact strength properties.

All publications mentioned herein are incorporated herein by reference to disclose and describe the methods and/or materials in connection with which the publications are cited.

Other objects, features and advantages of the present invention will become apparent from the following detailed description and examples. It should be understood, however, that the detailed description and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

FIG. 4 a schematic of a table computer or a cell phone according to an example of the present invention.

DETAILED DESCRIPTION OF THE INVENTION

A discovery has been made that provides a solution to at least some of the problems that may be associated with increasing the recycle content of a polycarbonate containing polymeric composition without detrimentally jeopardizing the usability of the composition in an article of manufacture (e.g., a chassis for an electronic device). In one aspect of the present invention, the discovery can include a polymeric composition containing 20 wt. % to 50 wt. % of a post-consumer mechanical recycled polycarbonate, 10 wt. % to 50 wt. % of a renewably sourced polycarbonate, 10 wt. % to 30 wt. % of a filler containing carbon fibers, and 5 wt. % to 15 wt. % of a flame retardant, where the polymeric composition can have a total recycle and renewable content of 50 wt. % to 90 wt. %. The mechanical properties of such compositions can be sufficient for use in articles of manufacture that may have substantial use and/or may be prone to dropping (e.g., a chassis for an electronic device). Notably, the high recycle and renewable content of the compositions of the present invention can lead to a more sustainable or "green" article of manufacture without comprising costs and/or mechanical strength.

Figure 1:
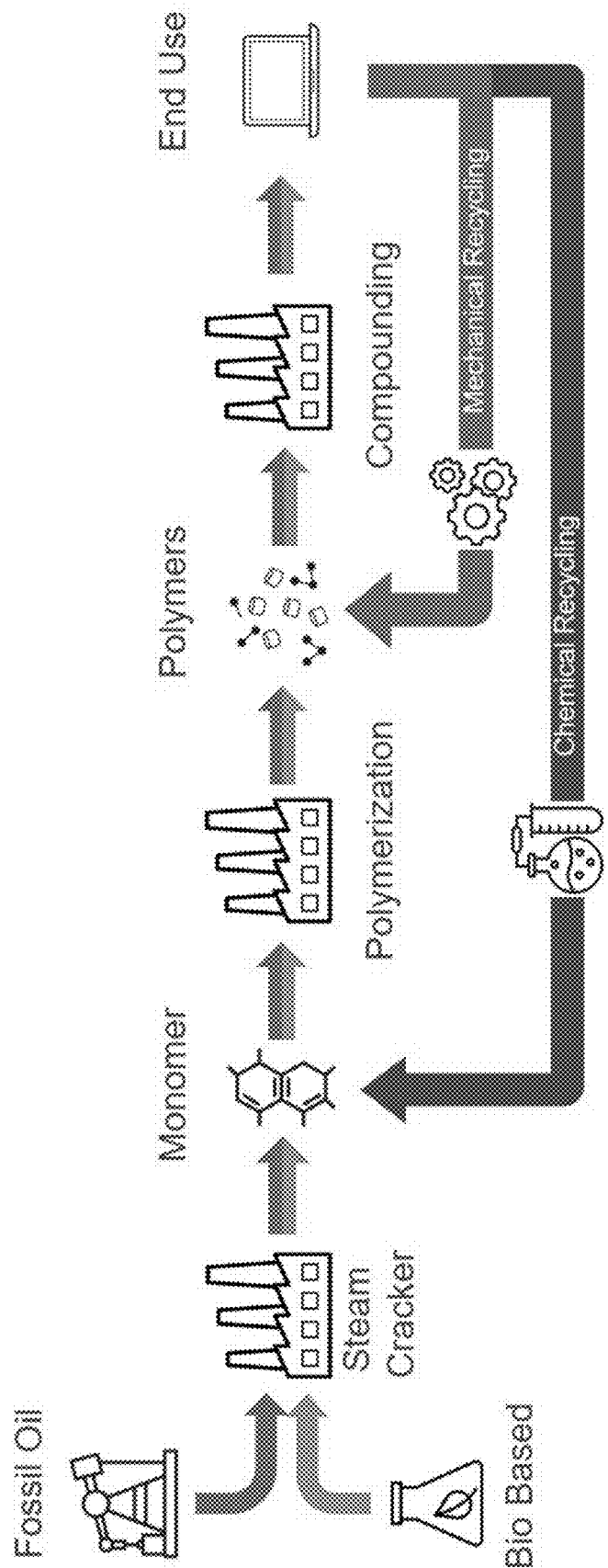
FIG. 1 illustrates a schematic of various polymer recycling methods.

Referring to FIG. 1, a schematic of polymer plastics recycling methods is provided. Polymers (e.g., polycarbonates) derived from fossil oil can be used to form various articles of manufacture (e.g., consumer products, such as computer chassis), which after use can become waste. Polymers are primarily recycled from the waste through mechanical recycling. In mechanical recycling, the waste is recycled through physical processes where the polymer chains are not reduced into monomer units forming the polymer. Rather, mechanical recycling typically includes collecting the waste having the target polymer (e.g., polycarbonate-based plastics), optionally washing the waste, melting the waste into a raw material having the target polymer, and reusing the raw material to produce new articles of manufacture. However, the mechanical properties of the mechanically recycled polymer can decrease due to the heat used in melting. The heat can weaken the molecular chains of the polymers. Polymers can also be recycled from waste by chemical recycling. In chemical recycling the polymers from the waste is depolymerized into the monomer units and the monomer units are re-polymerized to form the chemically recycled polymer. Further, polymers formed from bio-based chemicals can be also used to form the articles of manufacture increasing the renewable content of the articles. In certain aspects of the present invention, recycled and renewable content of a polymeric composition is increased while maintaining the desired mechanical properties of the composition by supplementing mechanical recycled polycarbonate content with renewably sourced polycarbonate, recycled carbon fibers, and optionally renewably sourced flame retardant. As illustrated in a non-limiting manner in the Examples, polymeric compositions of the present invention can have higher tensile elongation at break compared to a comparative composition without the renewably sourced polycarbonate.

These and other non-limiting aspects of the present invention are discussed in further detail in the following sections.

A. Polymeric Compositions

The polymeric composition can contain i) 20 wt. % to 50 wt. % or at least any one of, equal to any one of, or between any two of 20, 25, 30, 35, 40, 45, and 50 wt. % of a post-consumer mechanical recycled polycarbonate; ii) 10 wt. % to 50 wt. % or at least any one of, equal to any one of, or between any two of 10, 15, 20, 25, 30, 35, 40, 45, and 50 wt. % a renewably sourced polycarbonate; iii) 10 wt. % to 30 wt. % or at least any one of, equal to any one of, or between any two of 10, 15, 20, 25, and 30 wt. % of a filler containing carbon fibers, wherein at least a portion of the carbon fibers can be obtained from a post-industrial recycled source; and iv) 5 wt. % to 15 wt. % or at least any one of, equal to any one of, or between any two of 5, 7, 9, 10, 11, 13, and 15 wt. % of a flame retardant.

In certain aspects, the polymeric composition can further contain one or more additives selected from pigments, plasticizers, antioxidants, UV-stabilizers, heat stabilizers, dye enhancing agents, lubricant, mold release agents, crystal nucleating agents, fluidability-improving agents, antistatic agents, compatibilizers, or anti-drip agents. In certain aspects, the polymeric composition can contain pigments and plasticizer.

In certain aspects, the polymeric composition can contain i) 20 wt. % to 50 wt. % or at least any one of, equal to any one of, or between any two of 20, 25, 30, 35, 40, 45, and 50 wt. % of a post-consumer mechanical recycled polycarbonate; ii) 10 wt. % to 50 wt. % or at least any one of, equal to any one of, or between any two of 10, 15, 20, 25, 30, 35, 40, 45, and 50 wt. % a renewably sourced polycarbonate; iii) 10 wt. % to 30 wt. % or at least any one of, equal to any one of, or between any two of 10, 15, 20, 25, and 30 wt. % of a filler containing carbon fibers, wherein at least a portion of the carbon fibers are obtained from a post-industrial recycled source; iv) 5 wt. % to 15 wt. % or at least any one of, equal to any one of, or between any two of 5, 7, 9, 10, 11, 13, and 15 wt. % of a flame retardant; v) 0.1 wt. % to 3 wt. % or at least any one of, equal to any one of, or between any two of 0.1, 0.5, 1, 1.5, 2, 2.5 and 3 wt. % a pigment, and vi) 0 to 5 wt. % or at least any one of, equal to any one of, or between any two of 0, 0.5, 1, 1.5, 2, 2.5, 3, 3.5, 4, 4.5 and 5 wt. % of a plasticizer. The polymeric composition can have a total recycled and renewable content of 50 wt. % to 90 or at least any one of, equal to any one of, or between any two of 50, 55, 60, 65, 70, 75, 80, 85, and 90 wt. %.

1. Polycarbonates

The polycarbonates, such as the post-consumer mechanical recycled polycarbonate and the renewably sourced polycarbonate can contain carbonate units. The carbonate units can have the formula of formula (1)

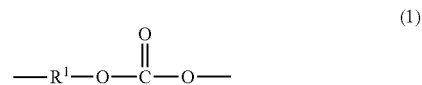

(1)

$R^1$ groups can contain aliphatic or aromatic groups. The carbonate units can be derived from sugars, hydroxy containing aliphatic groups and/or hydroxy aromatic groups. $R^1$ groups of the post-consumer mechanical recycled polycarbonate and the renewably sourced polycarbonate can be same or different. In certain aspects, the carbonate units can be derived from bisphenol A (BPA), e.g. carbonate units having the formula of formula (2)

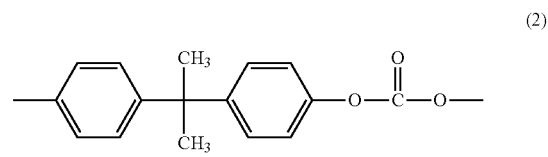

(2)

The polycarbonates can be homo-polymers and/or co-polymers. In polycarbonate homo-polymer each $R^1$ group in the polymer can be the same. The polycarbonate copolymers can contain polycarbonate containing different $R^1$ groups or polymers containing carbonate units (having same or different $R^1$), and other types of polymer units, such as ester units.

The post-consumer mechanical recycled polycarbonate can at least in part, be obtained by mechanical recycling of post-consumer waste containing polycarbonates. The post-consumer polycarbonate waste can be mechanically recycled by a suitable mechanical recycling method known in the art. Mechanical recycling of a polymer refers to recycling of the polymer from a waste material containing the polymer through a physical process where the polymer chains are not broken (e.g. chemically depolymerized) into the monomer units forming the polymer. In some aspects, the mechanical recycling can include the steps of grinding, washing, separating, drying, re-granulating and compounding, wherein each of the steps can occur 0 to multiple times. In some aspects, the mechanically recycled content in the post-consumer mechanical recycled polycarbonate can be, or the post-consumer mechanical recycled polycarbonate can have a recycle content of 80 wt. % to 100 wt. %, or 90 wt. % to 100 wt. %, or 95 wt. % to 100 wt. %, or 98 wt. % to 100 wt. %, or 99 wt. % to 100 wt. %, or about 100 wt. %, with the rest optionally being virgin polycarbonate.

The post-consumer mechanical recycled polycarbonate can contain polycarbonate homo-polymers and/or co-polymer. In certain aspects, the post-consumer mechanical recycled polycarbonate can contain carbonate units derived from bisphenol A (BPA) (e.g. formula 2). In certain aspects, the post-consumer mechanical recycled polycarbonate can contain homo-polymer(s) containing carbonate units derived from BPA. In certain aspects, the post-consumer mechanical recycled polycarbonate can contain co-polymer(s) containing carbonate units derived from BPA and other carbonate units and/or other types of polymer units. In some aspects, post-consumer mechanical recycled polycarbonate can include a combination of polycarbonate polymers.

The renewably sourced polycarbonate can at least in part, be obtained from a renewable feed stock. The renewably sourced polycarbonate can be a suitable polycarbonate known in the art. The renewably sourced polycarbonate can be a obtained from the renewable feed stock by methods known in the art. The renewably sourced polycarbonate can include polycarbonate homo-polymer and/or co-polymers. In certain aspects, the renewably sourced polycarbonate can contain homo-polymer(s) containing carbonate units derived from BPA (e.g. formula 2). In certain aspects, the renewable feed stock can be tall oil, sugar, castor beans and/or $CO_2$ such as $CO_2$ obtained from industrial waste. In some aspects, the renewably sourced polycarbonate can contain carbonate units derived from sugar. In some particular aspects, the renewably sourced polycarbonate can be obtained by reacting sugar with $CO_2$. Non-limiting examples of the sugar includes ribose, glucose, mannose and/or xylose. In some aspects, at least a portion of the $CO_2$ can be obtained from industrial waste. In some aspects, the sugar can be a sugar moiety in a thymidine group and/or a thymidine derivative. In some aspects, the renewably sourced polycarbonate can be a polycarbonate-polyester copolymer containing ester units derived from sebacic acid. In some particular aspects, the renewably sourced polycarbonate can be a polycarbonate-polyester copolymer containing ester units derived from sebacic acid and carbonate units derived from BPA. The sebacic acid can be obtained from castor beans. In some aspects, the renewably sourced polycarbonate can be obtained from feed stock obtained from tall oil from wood pulp. In some aspects, the renewably sourced polycarbonate can contain carbonate units derived from BPA, where the BPA is obtained from feed stock obtained from tall oil from wood pulp. In some aspects, the renewably sourced polycarbonate can be a homo-polymer containing carbonate units derived from BPA, where the BPA is obtained from feed stock obtained from tall oil from wood pulp. In some aspects, the renewably sourced polycarbonate can obtained from phenol and acetone, wherein the phenol, and/or acetone, can be at least in part obtained independently from renewable feed stock(s). In some aspects, the renewably sourced polycarbonate can be a BPA polycarbonate homo-polymer obtained from phenol and acetone, wherein the phenol, and/or acetone, can be at least in part obtained independently from renewable feed stock(s). In some aspects, at least a portion of the carbons in the renewably sourced polycarbonate can be derived from the renewable feed stock. In some aspects, at least a portion of the oxygens and/or hydrogens in the renewably source polycarbonate can be derived from non-renewable sources. In some aspects, at least 70%, or at least 80%, or at least 90%, or at least 95%, or 100% of the carbons in the renewably sourced polycarbonate can be derived from the renewable feed stock. In some aspects, the renewably sourced polycarbonate can be a homo-polymer containing carbonate units derived from BPA.

In some aspects, 13 wt. % to 65 wt. %, or at least any one of, equal to any one of, or between any two of 13, 15, 20, 25, 30, 35, 40, 45, 50, 55, 60 and 65 wt. % of the of the renewably sourced polycarbonate can be produced from the renewable feedstock. In some aspects, the renewably sourced polycarbonate can include a combination of polycarbonate polymers.

2. Carbon Fiber

The carbon fibers can at least in part, be post-industrial recycled carbon fibers (e.g., obtained by recycling post-industrial waste). The carbon fibers can be any suitable carbon fibers. The fibers can be sized, unsized, continuous, chopped, seeded, or non-continuous fibers or any combinations thereof. The sized fibers can be sized with a suitable sizing agents. The fibers can have a suitable length and diameter. The carbon fibers can contain standard modulus, intermediate modulus and/or high modulus carbons. In some aspects, the fibers can be provided in bundles In certain aspects, the carbon fibers can have average length of 1 to 100 mm, or at least any one of, equal to any one of, or between any two of 1, 10, 20, 30, 40, 50, 60, 70, 80, 90 and 100 mm. In certain aspects, the carbon fibers can have average filament diameter of 1 µm to 30 µm or at least any one of, equal to any one of, or between any two of 1, 5, 10, 15, 20, 25, and 30 µm. In certain aspects, the carbon fibers can have a sizing content of 0.5 wt. % to 10 wt. % or at least any one of, equal to any one of, or between any two of 0.5, 1, 2, 3, 4, 5, 6, 7, 8, 9 and 10 wt. %. In certain aspects, the carbon fibers can have a carbon density of 1.5 g/cc to 2 g/cc or 1.75 g/cc to 1.85 g/cc or at least any one of, equal to any one of, or between any two of 1.5, 1.6, 1.7, 1.75, 1.78, 1.8, 1.85, 1.9, 1.95 and 2 g/cc. In some, the carbon fibers have tensile modulus of 30 Msi to 55 Msi or at least any one of, equal to any one of, or between any two of 30, 31, 32, 33, 34, 35, 36, 37, 38, 39, 40, 41, 42, 43, 44, 45, 46, 47, 48, 49, 50, 51, 52, 53, 54, and 55 Msi. In some aspects, the carbon fibers can have a recycled content of 10 wt. % to 30 wt. % or at least any one of, equal to any one of, or between any two of 10, 15, 20, 25 and 30 wt. %. Examples of carbon fibers that can be used includes but are not limited to, RE-EVO® HSC commercially available from CARBONCONVERSIONS, RE-EVO® IMC commercially available from CARBONCONVERSIONS, or any combinations thereof.

3. Flame Retardants

In some aspects, the flame retardant can be obtained, at least in part, from a renewable source. In some aspects, the renewable content of the flame retardant can be 10 wt. % to 50 wt. %, or at least any one of, equal to any one of, or between any two of 13, 15, 20, 25, 30, 35, 40, 45, and 50 wt. %. In some aspects, the flame retardant can be a non-halogenated flame retardant. In some aspects, the flame retardant can be a non-halogenated phosphorus containing flame retardant obtained from bio-based chemicals. In some aspects, the bio-based chemicals can be tannin, tannic acid, phytic acid, isosorbide, diphenolic acid, deoxyribonucleic acid (DNA), lignin, or β-cyclodextrin or any combination thereof. In some aspects, the flame retardant can contain Bisphenol-A-diphosphate obtained from bio-based chemicals.

4. Additives

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic non-ionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like.

Colorants such as pigment and/or dye additives may also be present in the polymeric composition. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or any combination thereof.

In some aspects, the polymeric composition can have a density of 1.1 to 1.4 g/cc, or 1.25 at 1.35 g/cc, or 1.28 at 1.38 g/cc, or at least any one of, equal to any one of, or between any two of 1.1, 1.2, 1.25, 1.28, 1.29, 1.3, 1.35 and 1.4 g/cc at 23° C. measured in accordance with ASTM D 792. In some aspects, the polymeric composition can have a tensile modulus equal to or greater than 17000 MPa, or 17000 MPa to 22000 MPa, or 17000 MPa to 20000 MPa, or at least any one of, equal to any one of, or between any two of 17000, 17500, 18000, 18500, 19000, 19500, 20000, 21000 and 22000 MPa at 23° C., as measured in accordance with ISO 527-1,-2 at 1 mm/min. In some aspects, the polymeric composition can have a tensile strength at break equal to or greater than 155 MPa, or 155 MPa to 190 MPa, or 150 MPa to 170 MPa, or at least any one of, equal to any one of, or between any two of 155, 160, 165, 170, 175, 180, 185 and 190 MPa, at 23° C., as measured in accordance with ISO 527-1,-2 at 5 mm/min. In some aspects, the polymeric composition can have a tensile elongation at break ≥1.1%, ≥1.3%, ≥1.4%, or greater than 5%, or greater than 10%, as measured in accordance with ISO 527-1,-2 at 1 mm/min. In some aspects, the polymeric composition can have a flexural modulus equal to or greater than 15500 MPa, or 15500 MPa to 19000 MPa, or 16500 MPa to 17500 MPa, or at least any one of, equal to any one of, or between any two of 15500, 16000, 16500, 17000, 17500, 18000, 18500 and 19000 MPa at 23° C., as measured in accordance with ISO 178 at 2 mm/min. The polymeric composition can have any one of, any combination of, or all of the properties described in this paragraph.

B. Methods for Making the Polymeric Compositions

The thermoplastic compositions of the present invention can be made by various methods known in the art such as extrusion, injection molding, compression molding, blow molding, rotational molding, thermoforming, 3-D printing or any combination thereof. For example the components, such as the post-consumer mechanical recycled polycarbonate renewably sourced polycarbonate, carbon fibers, flame retardant, and/or the optional additives can be mixed together and then melt-blended to form the polymeric composition.

In some aspects, the one or any foregoing components described herein may be first dry blended with each other, or dry blended with any combination of foregoing components, then fed into an extruder from one or multi-feeders, or separately fed into an extruder from one or multi-feeders. The extruders used in the invention may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations comprising at least one of the foregoing. The extruder can generally be operated at a temperature higher than that necessary to cause the composition to melt and flow. In some aspects, the temperature of the melt in the extruder barrel can be maintained as low as possible in order to avoid excessive thermal degradation of the components. The melted composition exits extruder through small exit holes in a die. The extrudate can be quenched in a water bath and pelletized. The pellets so prepared can be of any desired length (e.g., one-fourth inch long or less). Such pellets can be used for subsequent molding, shaping, or forming.

Mixtures including any combination of the foregoing mentioned components may be subjected to multiple blending and forming steps if desirable. For example, the polymeric composition may first be extruded and formed into pellets. The pellets may then be fed into a molding machine where it may be formed into any desirable shape or product. In some aspects, the thermoplastic composition emanating from a single melt blender may be formed into sheets or strands and subjected to post-extrusion processes such as annealing, uniaxial or biaxial orientation.

C. Articles of Manufacture

The polymeric composition of the present invention can be comprised in an article of manufacture. Aspects of the disclosure also relate to articles including the polymeric composition described herein. In some aspects the article can be a film, a sheet, a molded article, a welded article, a filament or a powder. In one example, the composition can be incorporated into a film. The film may include at least one film layer that includes the thermoplastic composition. In further aspects the film includes at least a second film layer. Other film layers may include other materials.

The article can be a consumer product. In some aspects, the article can be a computer part. The computer can be desktop computer, laptop computer, notebook computer, cell phone, computer tablet, calculator or the like. In some particular aspects, the article can be a computer chassis or chassis part, such as a desktop computer chassis or chassis part or a laptop computer chassis or chassis part.

Figure 2:
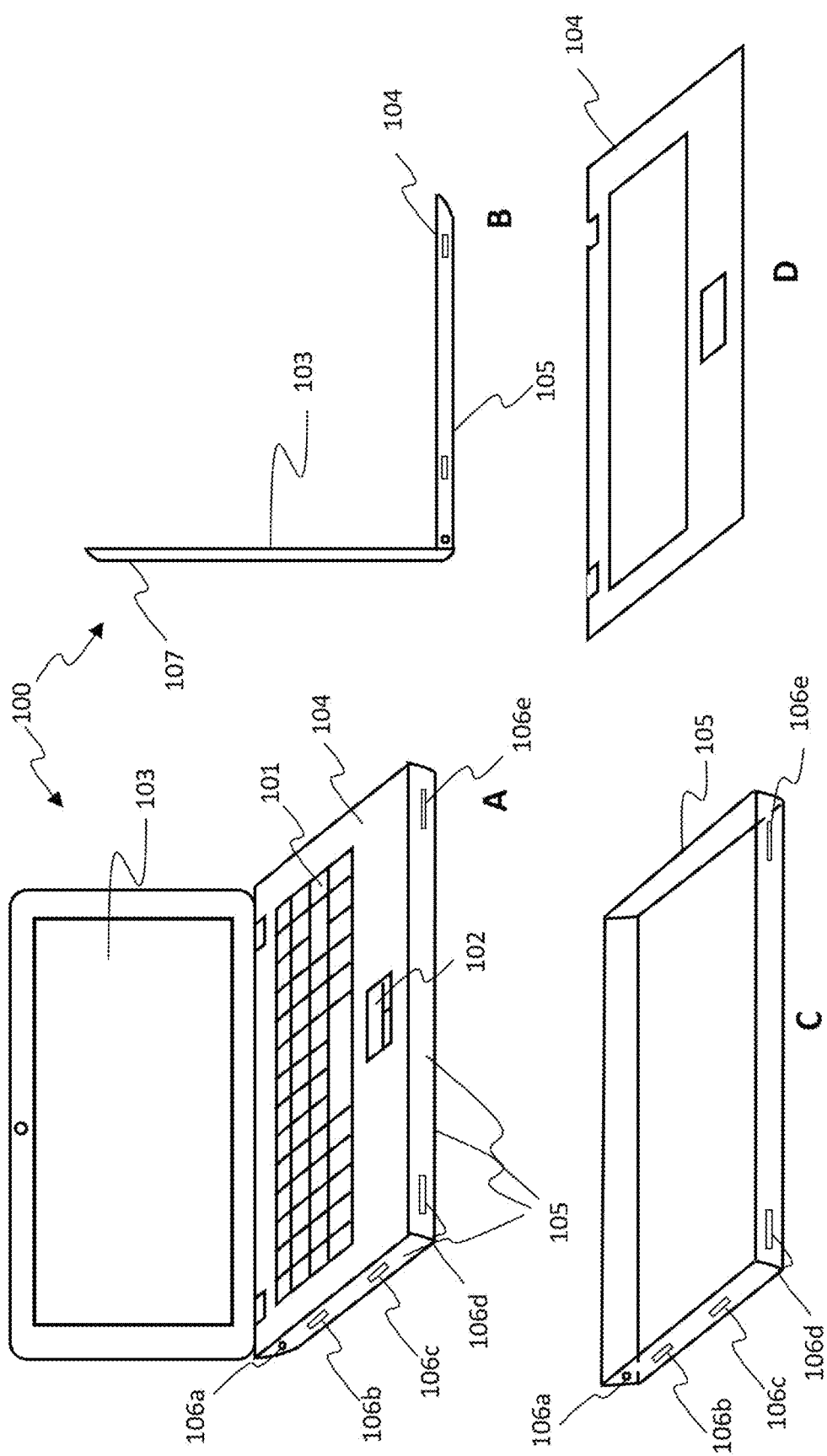
FIG. 2 a schematic of a laptop computer according to an example of the present invention. A) illustrates a front view of the laptop computer, B) illustrates a side view of the laptop computer, C) a schematic of a bottom panel of the laptop computer, and D) a schematic of a top panel of the laptop computer.

Referring to FIG. 2 a schematic of a laptop or a notebook computer 100 is shown. FIGS. 2A and 2B show a front view and a side view of the device 100 respectively. The laptop or notebook computer 100 can have a keyboard 101, a mouse pad 102, a screen/display 103, a top cover 104, a bottom cover 105 and a back cover 107. In some aspects, the chassis can include at least a portion of the top cover 104, bottom cover 105, or back cover 107, or any combination thereof or all thereof. The bottom cover 105 can have space/holes 106a-e for one or more ports (e.g. including but not limited to USB port(s), HDMI port(s), SD card port(s), VGA connector port(s), microphone and/or speaker port(s), laptop charger port(s), laptop lock slot(s) and/or Ethernet port(s)) configured to attach peripherals such as printers, scanners, storage drives, monitors, speakers, microphones, webcams, USB cables and/or drives, chargers, laptop locks, Ethernet cable and/or SD cards with the laptop. In some aspects, the top cover 104 and/or the back cover 107 can have one or more holes for one or more ports (not shown). FIGS. 2C and 2D show the top cover 104 and the bottom cover 105 respectively. The laptop or notebook computer can have central processing unit (CPU), storage unit, graphics processing unit, random access memory, sound card, speakers, webcam, microphone, motherboard and/or battery (not shown), in the space between the covers 104 and 105, and/or the space between the screen/display 103 and back cover 107. In some aspects, the top cover 104, bottom cover 105 and/or back cover 107 can contain a polymeric composition described herein. In some aspects, independently at least 70 wt. %, such as 70 wt. % to 100 wt. % of the top cover 104, bottom cover 105 and/or back cover 107 can contain a polymeric composition described herein. Independently, at least 70 wt. %, such as 70 wt. % to 100 wt. % of the top cover 104, bottom cover 105 and/or back cover 107 can be comprised of recyclable and/or renewable material, wherein the recyclable and/or renewable material contains plastics and/or carbon fibers.

Figure 3:
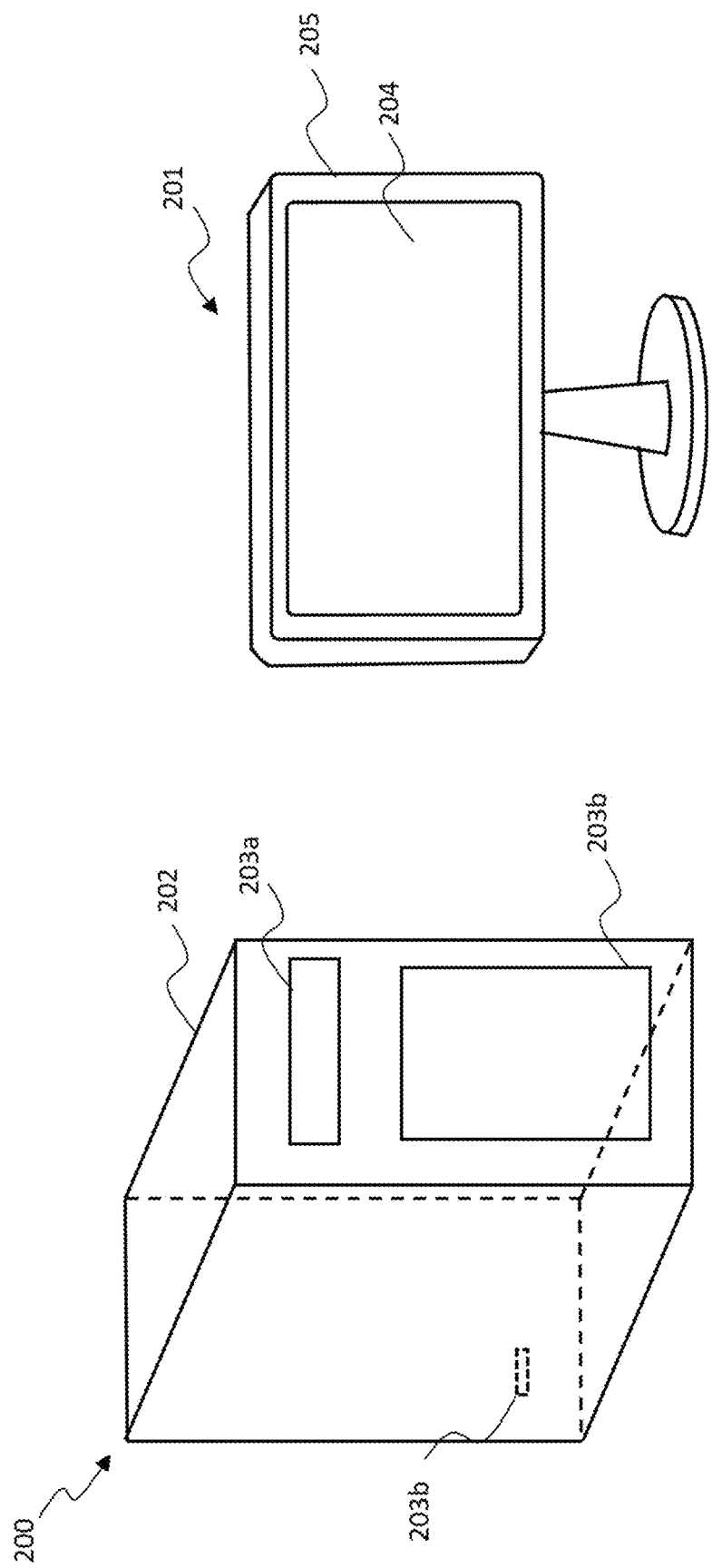
FIG. 3 a schematic of a desktop computer according to an example of the present invention.

Referring to FIG. 3 a schematic of desktop computer 200 is shown. The desktop computer 200 can contain a monitor 201 and a computer case 202. The monitor 201 can have a display screen 204 and a casing 205. In some aspects, the chassis can include at least a portion of the computer case 202 or casing 205, or any combination thereof or all thereof. The computer case 202 can house various computer hardware including but not limited to CPU, storage unit, graphics processing unit, random access memory, sound card, and/or motherboard (not shown). The computer case 202 can have one or more holes/spaces 203a-c to attach e.g. via various ports various computer hardware and peripherals such as media drives e.g. CD drives, printers, scanners, storage drives, monitors, speakers, microphones, webcams, USB cables and/or drives, chargers with the computer. In some aspects, the computer case 202 and/or the casing 205 can contain a polymeric composition described herein. In some aspects, independently at least 70 wt. %, such as 70 wt. % to 100 wt. % of the computer case 202 and/or the casing 205 can contain a polymeric composition described herein. Independently, at least 70 wt. %, such as 70 wt. % to 100 wt. % of the computer case 202 and/or the casing 205 can be comprised of recyclable and/or renewable material, wherein the recyclable and/or renewable material contains plastics and/or carbon fibers.

Referring to FIG. 4, a schematic of a tablet computer or cell phone 300 is shown. FIGS. 4A and 4B show a front view and a side view of the device 300 respectively. The tablet computer or cell phone 300 can contain a display screen 301 and a back panel 302. In some aspects, the chassis can include at least a portion of the back panel 302. Various tablet computer or cell phone hardware can be housed in between the display 301 and a back panel 302, such as including but not limited to processors, computer chips, cameras, microphone, speaker, and/or battery. In some aspects, the back panel can be a foldable panel. In some aspects, at least 70 wt. %, such as 70 wt. % to 100 wt. % of the back panel 302 can contain a polymeric composition described herein. At least 70 wt. %, such as 70 wt. % to 100 wt. % of the back panel 302 can be comprised of recyclable and/or renewable material, wherein the recyclable and/or renewable material contains plastics and/or carbon fibers.

In the context of the present invention, at least the following 20 aspects are described. Aspect 1 is directed to polymeric composition comprising: 20 wt. % to 50 wt. % of post-consumer mechanical recycled polycarbonate; 10 wt. % to 50 wt. % of renewably sourced polycarbonate; 10 wt. % to 30 wt. % of a filler comprising carbon fibers, wherein at least a portion of the carbon fibers are obtained from a post-industrial recycled source; and 5 wt. % to 15 wt. % of a flame retardant, wherein the polymeric composition comprises a total recycled and renewable content of 50 wt. % to 90 wt. %. Aspect 2 is directed to the polymeric composition of aspect 1, wherein the renewably sourced polycarbonate is produced, at least in part, from a renewable feedstock. Aspect 3 is directed to the polymeric composition of aspect 2, wherein the renewable feed stock comprises tall oil, caster beans, sugar, or waste carbon dioxide ($CO_2$), preferably tall oil. Aspect 4 is directed to the polymeric composition of any one of aspects 1 to 3, wherein 10 wt. % to 30 wt. % of the carbon fibers are obtained from post-industrial recycled source. Aspect 5 is directed to the polymeric composition of any one of aspects 1 to 4, wherein the carbon fibers are standard modulus fibers, intermediate modulus fibers, and/or high strength carbon fibers. Aspect 6 is directed to the polymeric composition of any one of aspects 1 to 5, wherein the flame retardant is obtained from a renewable source. Aspect 7 is directed to the polymeric composition of aspect 6, wherein the flame retardant is a non-halogenated phosphorus containing flame retardant obtained from bio based chemicals. Aspect 8 is directed to the polymeric composition of any one of aspects 1 to 7, further comprising an additive, wherein the additive is a pigment, a plasticizer, an antioxidant, an UV-stabilizer, a heat stabilizer, a dye enhancing agent, a lubricant, a mold release agent, a crystal nucleating agent, a fluidability-improving agent, an antistatic agent, a compatibilizer, or an anti-drip agent, or any combination thereof. Aspect 9 is directed to the polymeric composition of aspect 8, comprising 0.1 wt. % to 3 wt. % of a pigment, and 0 to 5 wt. % of a plasticizer. Aspect 10 is directed to the polymeric composition of any one of aspects 1 to 9, comprising any one of, a combination of, or all of the following properties: a density of 1 to 1.4 g/cc at 23° C. measured in accordance with ASTM D792; a tensile modulus equal to or greater than 17000 MPa, or 17000 MPa to 22000 MPa at 23° C., as measured in accordance with ISO 527-1, -2 at 1 mm/min; a tensile strength at break equal to or greater than 155 MPa, or 155 MPa to 190 MPa at 23° C., as measured in accordance with ISO 527-1, -2 at 5 mm/min; a tensile elongation at break equal to or greater than 1.1%, at 23° C., as measured in accordance with ISO 527-1, -2 at 5 mm/min; and/or a flexural modulus greater than 15500 MPa, or 15500 MPa to 19000 MPa at 23° C., as measured in accordance with ISO 178 at 2 mm/min. Aspect 11 is directed to the polymeric composition of any one of aspects 1 to 10, wherein the composition is comprised in a film, a layer, or a sheet. Aspect 12 is directed to the polymeric composition of any one of aspects 1 to 11, wherein the composition is an extruded, blow-molded, injection-molded, rotational molded, compression molded, 3-D printed and/or thermoformed composition. Aspect 13 is directed to the polymeric composition of any one of aspects 1 to 12, wherein the composition is comprised in an article of manufacture. Aspect 14 is directed to the polymeric composition of aspect 13, wherein the article of manufacture is a computer part. Aspect 15 is directed to the polymeric composition of any one of aspects 13 to 14, wherein the article of manufacture is a desktop computer chassis or chassis part or a laptop computer chassis or chassis part. Aspect 16 is directed to a computer chassis comprising the polymeric composition of any one of aspect 1 to 12. Aspect 17 is directed to the computer chassis of aspect 16, wherein the computer chassis is a desktop computer chassis, a laptop computer chassis, or a computer tablet chassis. Aspect 18 is directed to the computer chassis of any one of aspects 16 to 17, wherein at least 70 wt. % of the computer chassis comprises recyclable and/or renewable material, wherein the recyclable and/or renewable material comprises plastics and/or carbon fibers. Aspect 19 is directed to a method of making a computer chassis of any one of aspects 16 to 18, the method comprising obtaining the polymeric composition of any one of aspects, 1 to 12 and forming at least a portion of the computer chassis with the polymeric composition. Aspect 20 is directed to the method of aspect 19, wherein at least 70 wt. % of the computer chassis comprises recyclable and/or renewable material, wherein the recyclable and/or renewable material comprises plastics and/or carbon fibers.

EXAMPLES

The present invention will be described in greater detail by way of specific examples. The following examples are offered for illustrative purposes only, and are not intended to limit the invention in any manner Those of skill in the art will readily recognize a variety of noncritical parameters which can be changed or modified to yield essentially the same results.

Example 1

A Polymeric Resin Composition of the Present Invention

Table 1 provides a non-limiting resin composition of the present invention.

TABLE 1

Resin composition

| Components | Wt. % |
|---|---|
| Post-consumer mechanical recycled polycarbonate | 30 |
| Renewably sourced polycarbonate having renewable content 51 wt. % | 41 |
| Post-industrial recycled carbon fibers | 20 |
| Flame retardant | 8 |
| Pigment | <<1 |
| Total | 100 |

Components of table 1 were dry blended and melt extruded to form molded compositions containing the resin of table 1.

Mechanical properties of the molded composition was tested using standard methods. The molded resin composition of table 1 had a density of 1.29 g/cc measured in accordance with ASTM D 792, a tensile modulus of 19010 MPa, (5 mm/min), as measured in accordance with ASTM D638, a tensile strength at break, (Type 1, 5 mm/min), of 160 MPa as measured in accordance with ASTM D638, and a tensile elongation at break, (Type 1, 5 mm/min), of 1.1%, ASTM D638 at 5 mm/min.

Components of table 1 were dry blended and melt extruded to form pellets containing the resin of table 1. The pellets were injection molded to form a 1.2 to 1.6 mm thick back panel of a laptop computer.

A second composition containing having similar components, (e.g. containing a second post-consumer mechanical recycled polycarbonate, a second renewably sourced polycarbonate, second post-industrial recycled carbon fibers, flame retardant and pigments), with same respective weight percentages were made. Mechanical properties of a molded second composition was tested using standard methods. The molded second composition had a tensile modulus of 19500 MPa at 23° C. as measured in accordance with ISO 527-1,-2 at 1 mm/min, a tensile strength at break of 165 MPa at 23° C. as measured in accordance with ISO 527-1,-2 at 5 mm/min, a tensile elongation at break of 1.3% at 23° C. as measured in accordance with ISO 527-1,-2 at 5 mm/min, and a flexural modulus of 17000 as measured in accordance with ISO 178 at 2 mm/min.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A polymeric composition comprising:
    20 wt. % to 50 wt. % of post-consumer mechanical recycled polycarbonate;
    10 wt. % to 50 wt. % of renewably sourced polycarbonate, wherein at least a portion of the renewably sourced polycarbonate being renewable content;
    10 wt. % to 30 wt. % of a filler comprising carbon fibers, wherein at least a portion of the carbon fibers are obtained from a recycled source; and
    5 wt. % to 15 wt. % of a flame retardant,
    wherein the polymeric composition comprises a total recycled and renewable content of at least 50 wt. %.

2. The polymeric composition of claim 1, wherein the renewably sourced polycarbonate is produced, at least in part, from a renewable feedstock.

3. The polymeric composition of claim 2, wherein the renewable feed stock comprises tall oil, caster beans, sugar, or waste carbon dioxide ($CO_2$).

4. The polymeric composition of claim 1, wherein 10 wt. % to 30 wt. % of the carbon fibers are obtained from the recycled source.

5. The polymeric composition of claim 1, wherein the carbon fibers are standard modulus fibers, intermediate modulus fibers, and/or high strength carbon fibers.

6. The polymeric composition of claim 1, wherein the flame retardant is obtained from a renewable source.

7. The polymeric composition of claim 6, wherein the flame retardant is a non-halogenated phosphorus containing flame retardant obtained from bio based chemicals.

8. The polymeric composition of claim 1, further comprising an additive, wherein the additive is a pigment, a plasticizer, an antioxidant, an UV-stabilizer, a heat stabilizer, a dye enhancing agent, a lubricant, a mold release agent, a crystal nucleating agent, a fluidability-improving agent, an antistatic agent, a compatibilizer, or an anti-drip agent, or any combination thereof.

9. The polymeric composition of claim 8, comprising 0.1 wt. % to 3 wt. % of a pigment, and 0 to 5 wt. % of a plasticizer.

10. The polymeric composition of claim 1, comprising any one of, a combination of, or all of the following properties:
- a density of 1 to 1.4 g/cc at 23° C. measured in accordance with ASTM D792;
- a tensile modulus equal to or greater than 17000 MPa, or 17000 MPa to 22000 MPa at 23° C., as measured in accordance with ISO 527-1, -2 at 1 mm/min;
- a tensile strength at break equal to or greater than 155 MPa, or 155 MPa to 190 MPa at 23° C., as measured in accordance with ISO 527-1, -2 at 5 mm/min;
- a tensile elongation at break equal to or greater than 1.1%, at 23° C., as measured in accordance with ISO 527-1, -2 at 5 mm/min; and/or
- a flexural modulus greater than 15500 MPa, or 15500 MPa to 19000 MPa at 23° C., as measured in accordance with ISO 178 at 2 mm/min.

11. The polymeric composition of claim 1, wherein the composition is comprised in a film, a layer, or a sheet.

12. The polymeric composition of claim 1, wherein the composition is an extruded, blow-molded, injection-molded, rotational molded, compression molded, 3-D printed and/or thermoformed composition.

13. The polymeric composition of claim 1, wherein the composition is comprised in an article of manufacture.

14. The polymeric composition of claim 13, wherein the article of manufacture is a computer part.

15. The polymeric composition of claim 13, wherein the article of manufacture is a desktop computer chassis or chassis part or a laptop computer chassis or chassis part.

16. A computer chassis comprising the polymeric composition of claim 1.

17. The computer chassis of claim 16, wherein the computer chassis is a desktop computer chassis, a laptop computer chassis, or a computer tablet chassis.

18. The computer chassis of claim 16, wherein at least 70 wt. % of the computer chassis comprises recyclable and/or renewable material, wherein the recyclable and/or renewable material comprises plastics and/or carbon fibers.

19. A method of making the computer chassis of claim 16, the method comprising obtaining the polymeric composition of claim 1 and forming at least a portion of the computer chassis with the polymeric composition.

20. The method of claim 19, wherein at least 70 wt. % of the computer chassis comprises recyclable and/or renewable material, wherein the recyclable and/or renewable material comprises plastics and/or carbon fibers.

\* \* \* \* \*